Dec. 13, 1932.  C. F. OGREN  1,891,186
BRAKE LINING
Filed June 4, 1929
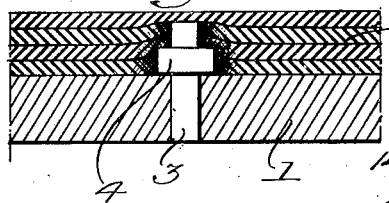
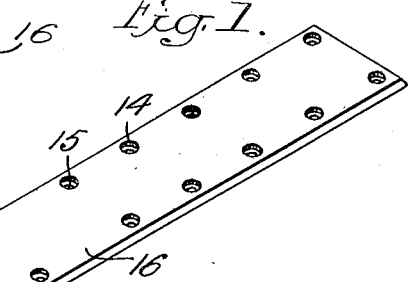
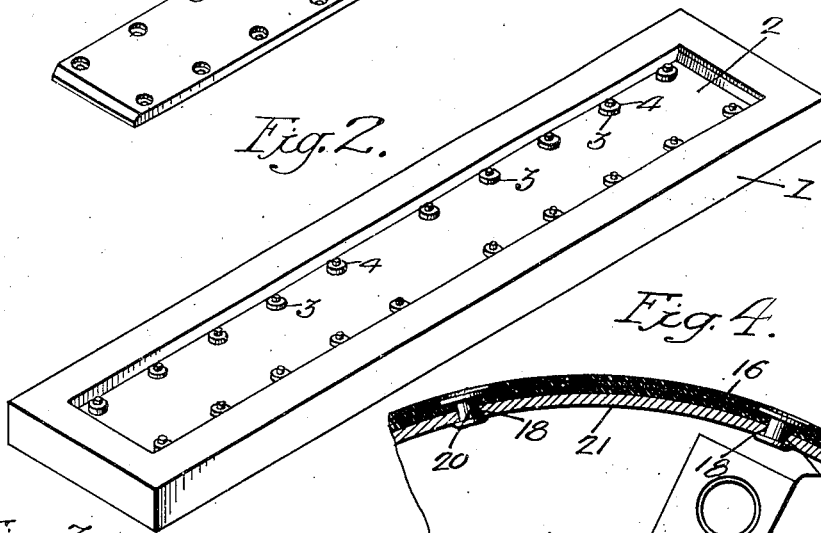
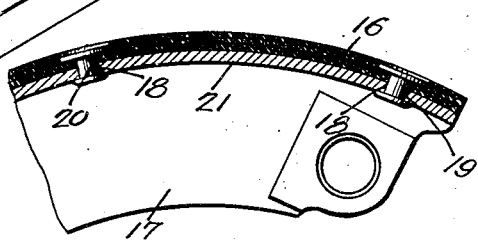
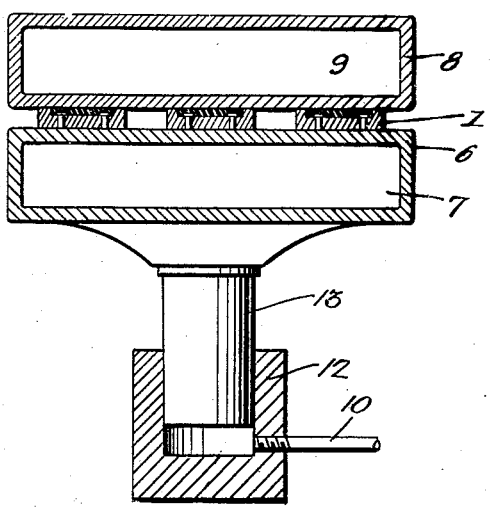
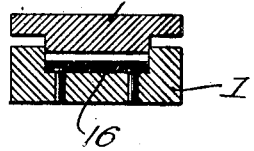
Inventor:
Carl F. Ogren
by his Attorneys
Howson & Howson Patented Dec. 13, 1932

1,891,186

UNITED STATES PATENT OFFICE

CARL F. OGREN, OF TRENTON, NEW JERSEY, ASSIGNOR TO THERMOID RUBBER COMPANY, OF TRENTON, NEW JERSEY, A CORPORATION OF NEW JERSEY

BRAKE LINING

Application filed June 4, 1929. Serial No. 368,408.

This invention relates to improvements in brake lining, and is more particularly concerned with a novel process of molding, and with the resultant product.

Since the early days of making brake lining of the flexible or semi-flexible type, it has been the custom to make and market it in rolls. There are two main classes of brake linings made in this roll form,—one of which is made by dipping or impregnating a tape of asbestos or the like, preferably having metallic threads interlaced therein, in a solution of oils or hydrocarbons; baking the impregnated tape; and finally sizing it by passing it between calender rolls. The other class above referred to, is made by frictioning a rubber compound on asbestos, or other suitable material such as metallic cloth, cutting the cloth to a proper length, and folding it to give the requisite number of plies for the thickness required. The product thus produced is then vulcanized in steam-heated hydraulic presses.

In my construction, however, pieces of lining suitable in size for application to car brakes are molded individually. In carrying out my process, long strips of brake lining are first made up in the usual way, and are carried up to that point in the process where it is to be vulcanized, or placed on the presses. Before vulcanizing, the lining is preferably cut to the approximate length required on the particular car brake for which it is made, and is then inserted in a mold, which is pressed between the platens, preferably steam-heated, of a press, and is therein thoroughly compressed and vulcanized.

An object of my invention is to devise a new and improved process of producing molded brake lining.

Another object is to produce a new and improved product of molded brake lining.

Another object is to produce a brake lining having closed and water-proofed edges around its entire periphery.

Another object is to produce a brake lining having substantially uniform density and thickness throughout its entire extent.

Another object is to produce a brake lining characterized by the absence of cut and unwater-proofed rivet holes.

Another object is to produce a brake lining wherein the rivet holes are reinforced and strengthened.

Another object is to devise a method of producing brake lining characterized by the strength and reinforcement of rivet holes formed therein during the production process.

Another object is to produce a brake lining characterized by its increased density and compactness over that of the brake linings of the prior art.

Still another object is to produce a brake lining which, when applied to the brake shoe, will be adapted for riveting thereon without the production of detrimental bulging between adjacent rivets, and to this end the invention contemplates the provision of a lining wherein the longitudinal spacing between rivet holes formed therein is slightly less than the distance between adjacent rivet holes.

Other objects will appear hereinafter.

In the drawing, in which is illustrated one form of my invention, together with a preferred method of producing the same;

Fig. 1 is a perspective view of the finished product;

Fig. 2 is a perspective view of the mold;

Fig. 3 is a vertical sectional view through a plurality of the molds assembled on one form of steam-heated hydraulic press, by which the desired compression force is applied to the material in the mold;

Fig. 4 is a fragmentary section through a brake shoe to which the lining according to my invention is applied;

Fig. 5 is a section through a modified form of the mold according to my invention, employing a cover member; while Fig. 6 is a fragmentary sectional detail through a portion of the mold with its countersink pins, and illustrates the manner in which the plies of the lining 16 are molded around the pins, to increase the density of the lining beneath the countersunk portions of the rivet holes, the lining being illustrated in a substantially fully molded condition and immediately prior to complete perforation of the lining by the pin.

At 1 is a mold having a substantially centrally arranged elongated depression 2 adapted for the reception of the material to be molded. This mold, while it may be made of any desirable material, is preferably formed from a hardened substance such as steel, and the recess 2 is preferably provided with a plurality of pins 3, usually shouldered as shown at 4, in order to produce properly shaped rivet holes in the lining. If desirable, a cover such as shown at 11 in Fig. 5, may be employed to coact with the mold 1 in order to properly apply pressure to the moldable lining. Sometimes it is desirable to cut a plurality of cavities of the type illustrated at 2 side by side in a single piece of metal in order to economize on material and space.

In practicing the present invention, the lining may be made in strips in the usual manner up to that point in the process just prior to the step of vulcanization. At this point, the strips are divided into lengths suitable for placing within the molding depressions 2. Together with the lining material, the mold or molds may now be placed on the movable platens 6 of a suitable press, which also includes a fixed platen 8, each platen being provided in the preferred instance with a steam chamber such as shown at 7 and 9. Hydraulic or other suitable type of pressure from a suitable source is now admitted through a pipe 10 to the lower end of a cylinder 12 in which operates a plunger 13 associated with the movable platen 6, whereby this platen is elevated and the molds are brought into engagement with the fixed platen 8, thus forming the lining material, molded under the heat, to the desired shape.

It will be obvious that during the process of molding under application of steam heat, the lining material will be softened to a point where it will tend to spread throughout its extent. This tendency, however, will be resisted by the side walls of the depression 2, and this confining action, together with the restraining influence of the cover 11, will tend to produce a lining which, throughout its extent, will be of substantially uniform density and thickness. Another advantageous feature resulting from my process is that, as illustrated in Fig. 6, the edges of the plies of the lining 16 around the countersink portions 4 will be greatly compressed during the holding process, so that the amount of material forming the thickness around the rivet holes 14 will be substantially the same as through the remainder of the lining, and, because of its reduced section, of even greater density and strength than through the body of the lining. This construction is especially advantageous, inasmuch as it imparts the increased density and strength to the region of the lining, surrounding the rivet holes, where it is most desired, thus securely retaining the lining in position and forming a marked departure from the practice of machine-counterboring and resultant cutting away of the material at a point where its strength should be greatest. In this connection, it is to be pointed out that by avoiding machine-counterboring, there is no tendency to raise a burr on the underside of the lining, which burr has been found to interfere with close adjustment of the brakes.

Still another advantageous feature of my invention specifically brought out with reference to Fig. 6, is that the formation of the rivet holes 14, together with their countersunk portions 15, is produced simultaneously with the production of the molded lining, so that the material around the rivet holes 14 is sealed against moisture. In fact the molding of the material according to my process results in closed or sealed edges around the entire periphery of the lining thus preventing the absorption of moisture by the fabric of the lining, which so often happens with the lining formed in the ordinary manner, and which is often times accompanied by detrimetal grabbing or binding of the brakes.

As an example of the application of the lining produced according to my invention, a brake shoe of conventional form is illustrated at 17 in Fig. 4. This shoe is shown as provided, as is ordinarily the case, with a plurality of rivet holes 19. The spacing of these holes is ordinarily predetermined, and is a constant. In order to prevent bulging of the lining between adjacent rivet holes when the lining is placed in position, the pins 3 in the mold recess 2 are spaced apart from each other a distance slightly less than that between adjacent rivet holes 18 in the shoe 17. The molded lining 16, after the outermost rivet hole has been secured to the shoe by suitable means such as the rivet 19, would then have to be stretched in order to bring the holes 14 into full registration with the adjacent rivet holes 18.

It will be noted that since the flange 21 of the brake shoe 17 and the lining 16 when stretched about the flange 21 are substantially concentric with each other, the linear distance between points 19 and 20 around the circumference of the flange 21 will be less than that between the points 19 and 20 on the lining 16.

It follows then, that if in the ordinary method of boring the rivet holes in the lining a distance apart from each other substantially equal to the linear distance between the rivet holes on the brake shoes, the lining would have to be stretched a certain amount to bring the holes of the lining in exact registration with the holes on the shoe. It will be obvious then, from a consideration of my invention, that if the linear distance from center to center between adjacent rivet holes 14 on my brake lining 16 is slightly less than the linear distance between the holes 18 in the shoe, the amount of stretching necessary to secure the exact registration between the holes of the shoe and the corresponding holes of the lining will be greatly increased. This increased amount of stretching will quite obviously eliminate all bulging of the lining between the rivets, and this results in the production of a lining which, when applied to the shoe, will be uniformly spaced from the brake drum throughout the entire extent of the lining.

The process of curing the lining in individual molds has been found to result in much greater dimensional accuracy in the product than is the case where the usual long length curing process is employed. In order to have this desired accuracy, some manufacturers at the present time resort to grinding the surface of the lining, but this is found to be disadvantageous, since it exposes the under surface of the lining, and produces a non-uniform surface for braking. Further, my process produces a lining of greater density than is ordinarily the case, by reason of confining all the sides during the molding process, thus preventing any tendency of spreading of the material. This is differentiated from the ordinary method of curing, wherein the edges are free to spread, with consequent distortion under pressure.

As regards the economical side of production, there is a material amount of labor saving since the lining produced is exactly the proper length, and the rivet holes and counter-bores have been substantially automatically formed. Further, since the lining is cut to the exact length, there is no waste of the materal encountered in the ordinary application of brake linings from rolls, and from the strip ordinarily remaining at the end of the roll.

The foregong description is merely by way of exemplification, and it is to be understood that my invention is susceptible to numerous modifications and adaptations, and it is intended that it be limited only by the scope of the appended claim.

I claim:

The combination with a brake shoe having a series of securing-element-receiving openings extending longitudinally thereof, of a brake lining comprising a composite strip capable of limited longitudinal stretching and having formed therein a series of openings corresponding in arrangement to the openings of the brake shoe with which it is to be employed but spaced from one another a distance slightly less than the distance through which the corresponding openings of the brake shoe are spaced whereby said brake shoe lining must be stretched in application to the shoe in order to bring the openings thereof into alignment with the openings of the shoe.

CARL F. OGREN.